United States Patent
Morrison (10) Patent No.: US 7,949,478 B2
(45) Date of Patent: May 24, 2011

(54) HOSE ASSEMBLY ANALYSIS APPARATUS AND METHODS

(75) Inventor: Leigh W Morrison, Footscray (AU)

(73) Assignee: Australasian Steel Products Pty Ltd, Victoria (AU)

( * ) Notice: Subject to any disclaimer, the term of this patent is extended or adjusted under 35 U.S.C. 154(b) by 1064 days.

(21) Appl. No.: 11/662,196

(22) PCT Filed: Mar. 18, 2005

(86) PCT No.: PCT/AU2005/000378
§ 371 (c)(1), (2), (4) Date: Apr. 6, 2007

(87) PCT Pub. No.: WO2006/002454
PCT Pub. Date: Jan. 12, 2006

(65) Prior Publication Data
US 2008/0059082 A1    Mar. 6, 2008

(30) Foreign Application Priority Data
Jul. 2, 2004   (AU) ................................ 2004903658

(51) Int. Cl.
*G01M 13/00* (2006.01)
(52) U.S. Cl. .......................................... 702/34; 702/114
(58) Field of Classification Search .................... 702/33, 702/34, 35, 36, 113, 114
See application file for complete search history.

(56) References Cited

U.S. PATENT DOCUMENTS

| | | | |
|---|---|---|---|
| 4,167,868 A | 9/1979 | Bobo et al. | |
| 4,817,016 A | 3/1989 | Thompson et al. | |
| 5,767,671 A * | 6/1998 | McCoy et al. | 324/209 |
| 6,424,930 B1 * | 7/2002 | Wood | 702/184 |
| 6,442,511 B1 * | 8/2002 | Sarangapani et al. | 702/194 |
| 6,490,543 B1 * | 12/2002 | Jaw | 702/184 |
| 6,691,065 B2 * | 2/2004 | Hayashi et al. | 702/184 |
| 6,922,640 B2 * | 7/2005 | Vezzu et al. | 702/34 |
| 7,076,396 B2 * | 7/2006 | Klausner et al. | 702/181 |
| 7,195,149 B2 * | 3/2007 | Baker et al. | 235/375 |
| 2004/0122619 A1 | 6/2004 | Malone et al. | |
| 2005/0005186 A1 * | 1/2005 | Goebel et al. | 714/1 |
| 2005/0143956 A1 * | 6/2005 | Long et al. | 702/184 |
| 2005/0209817 A1 * | 9/2005 | Kathula et al. | 702/179 |

FOREIGN PATENT DOCUMENTS

| | | |
|---|---|---|
| AU | 715320 | 1/2000 |
| EP | 0 972 937 A2 | 1/2000 |
| JP | A 08-094509 | 4/1996 |
| WO | WO 02/069666 A2 | 9/2002 |

* cited by examiner

*Primary Examiner* — Jeffrey R West
(74) *Attorney, Agent, or Firm* — Oliff & Berridge, PLC (57) ABSTRACT

An in-situ lifespan is predicted for a hydraulic or pneumatic hose assembly for a particular installation, so that the hose assembly may be replaced before failure. A user of the apparatus, e.g. whilst on-site, is prompted to enter basic hose data together with a rating for a number of lifespan factors. The apparatus then determines a basic hose assembly lifespan based on the input hose data, and modifies the basic lifespan based on the ratings for the various lifespan factors. A hose assembly grading system is also described.

8 Claims, 5 Drawing Sheets

| Grade | Determination |
|---|---|
| 1 | Fit for purpose |
| 2 | Limited life remaining; replace as soon as practical |
| 3 | Imminent failure; replace immediately. |

| | Classification | Rating |
|---|---|---|
| Index | Nil | 0 |
| | Light | 1 |
| | Moderate | 2 |
| | Constant | 3 |
| | Severe | 4 |
| | Acute | 5 |
| | Extreme | 6 |
| | Destructive | 7 |

← 50

| Rated Hose Assembly Parameters | | | | |
|---|---|---|---|---|
| Limiting Factors | Impulse Life | 80% | Service Life | 10 |
| Hose Assembly Data | Hose Type | Hose ID | Hose Size | 16 |
| | Description | Hose Description | | |
| | MWP bar | 350 | MBP bar | 1,400 |
| | Impulse Cycles | 1,000,000 | %MWP | 133% |
| | Temperature - Minimum °C | -40 | Maximum °C | 121 |
| | Minimum Bend Radius mm | 300 | MBR Rating | 0 |
| | Working Fluid (WF) | Oil | Note | Synthetic |
| | External Fluid (EF) | Air | Note | <71°C,166°F |
| | Tube Type | Neoprene | WF Rating | 0 |
| | Cover Material | Nitrile | EF Rating | 0 |
| | Cover Type | Cover ID | Abrasion Rating | 1.5 |
| | Cover Protection (Shielding) | Shield ID | Abrasion Rating | 5 |
| | Coupling Material | Steel | Corrosion Rating | 0 |
| | Hose Assembly Line Type | Pressure | Max Velocity (m/s) | 6.1 |
| | Flow Rate - Low (Lt/min) | 90 | High | 180 |

← 52

| Impulse Life | | |
|---|---|---|
| Impulse Life | Pulses (in '000s) pa | 100 |
| | Bend Radii at Couplings | 2 |
| | Flexing | 2 |
| | Transient Pulses | 1 |
| | Other | 0 |
| | Score (Years) | 6.6 |

← 54

| Service Life | | |
|---|---|---|
| Service Life | Temp deg C | 85 |
| | MWP bar | 300 |
| | Abrasion | 3 |
| | Bend Radii of Hose | 2 |
| | Coupling Corrosion | 3 |
| | Working Fluid - Hose Tube | 0 |
| | External Fluid - Hose Cover | 0 |
| | Environment | 0 |
| | Mechanical Loads | 0 |
| | Routing | 1 |
| | Other | 0 |
| | Score (Years) | 6.7 |

← 56

| Predicted Lifespan (Yrs) | 6.6 |
|---|---|

| Category | Factor | Description |
|---|---|---|
| Impulse Life | Bend Radii at Coupling | Near Coupling - Static |
| | | Near Coupling - Operational |
| | Flexing | Amplitude |
| | | Frequency |
| | Number of Pulses pa | Amplitude |
| | | Frequency |
| | Transient Pulses | Amplitude |
| | | Variation |
| | Other | Local factors |
| Service Life | Abrasion | Rubbing |
| | | Gouging |
| | Bend Radii of Hose | General - Static |
| | | General - Operational |
| | Cover Protection | Nylon Sleeve |
| | | Wire Armour |
| | | Wire Spring |
| | | Silicon Fire Sleeve |
| | | Fibre Glass Sleeving |
| | | Spiral Guard |
| | | Whipcheck |
| | Coupling Corrosion | Corrosive |
| | Environment | Ambient Pressure |
| | | Ozone |
| | | UV Light |
| | | Radiation |
| | Fluid – External | Compatibility with Hose Cover |
| | Fluid - Working | Compatibility with Hose Tube |
| | | Pressure |
| | | Temperature |
| | | Velocity |
| | Mechanical Loads | Vibration |
| | | Tensile |
| | | Shear |
| | Routing | Orientation |
| | | Twisting |
| | | Equipment Extension |
| | | Securing Points |
| | | External Loads |
| | | Securing Method |
| | Temperature | Ambient |
| | | Variation (Stop / Start) |
| | Other | Local Factors |

Fig. 6

| Procedure | Determination | Action |
|---|---|---|
| Check the label for damage and legibility | If label is lost, illegible or otherwise damaged | If label is lost, illegible or otherwise damaged – replace. |
| | If hose assembly is past its Lifespan expiry date | Consult Vendor for advice. If in doubt – Grade 2 |
| Check first Coupling and look for the presence of oil, corrosion, cracking, looseness, mechanical damage and crookedness | If there is no oil, corrosion, cracking, looseness, mechanical damage and crookedness | Grade 1 |
| | If there is sweating of oil, mild corrosion, no mechanical damage or crookedness | Grade 2 |
| | If there is weeping oil or significant corrosion or mechanical damage or crookedness | Grade 3 |
| Check second Coupling and look for the presence of oil, corrosion, cracking, looseness, mechanical damage and crookedness | If there is no oil, corrosion, cracking, looseness, mechanical damage and crookedness | Grade 1 |
| | If there is sweating of oil, mild corrosion, no mechanical damage or crookedness | Grade 2 |
| | If there is weeping oil or significant corrosion or mechanical damage or crookedness | Grade 3 |
| Check the hose cover and look for oil sweats, blisters, broken wires (of reinforcement), exposed reinforcement wires, abrasion, cracking, brittleness, missing supports, tight bend radii, kinks, deformed shape and other mechanical damage | If there are no oil sweats, blisters, broken wires, exposed reinforcement wires, abrasion (or just very mild abrasion), cracking, brittleness, missing supports, tight bend radii, kinks, deformed shape or other mechanical damage | Grade 1 |
| | If there is oil sweat, small blisters or mild to moderate abrasion where reinforcement is still covered | Grade 2 |
| | If there is moderate or greater oil sweats, moderate or greater blisters, broken wires, exposed reinforcement wires, abrasion to the reinforcement, cracking, brittleness, kinks, deformed shape or other mechanical damage | Grade 3 |
| | If there is missing supports or tight bend radii | Support and or re route as necessary. Then review. |
| If the hose assembly is protected by an external sleeve or armour then check hose cover to the extent possible and grade as above and check the protection for damage or looseness | If the protection is loose and it is found that the hose cover is okay | Re-secure hose protection and review. If in doubt – Grade 2 |
| | If the protection has sustained mild damage | Grade 2 |
| | If the protection has sustained significant damage | Grade 3 |

Fig. 8

HOSE ASSEMBLY ANALYSIS APPARATUS AND METHODS

The present invention relates to hose assemblies, and to the analysis of such hose assemblies.

Hydraulic and pneumatic control and power systems are used with a wide variety of machines and tools and in a wide variety of situations.

A critical feature of these systems is the integrity of the hose assemblies that convey the hydraulic or pneumatic fluid. For example, hose assembly failure may cause associated machinery to malfunction, which may result in injury to personnel, damage to equipment and expensive plant downtime. Also, a failed hose assembly may itself cause damage or injury. For example, personnel may be struck by a whipping hose or by high pressure fluid escaping from the hose. In the latter case, a person may be sprayed by the conveyed fluid or, more seriously, the conveyed fluid may be injected into a person due to the high pressures involved.

Clearly, there is a need to minimise hose assembly failures, and one approach to this is to ensure that all hose assemblies pass appropriate industry standards, e.g. SAE J343 or ISO 6605, and are appropriately pressure rated for the application at hand. For example, a hose assembly may need to meet a minimum burst pressure requirement, and should be able to survive without failure for a set number of fluid impulse cycles, e.g. 500,000 pulses.

An aim of the present invention is to provide new and advantageous apparatus and methods for reducing hose assembly failure concerns for hydraulic and pneumatic systems.

Viewed from one aspect, the present invention provides a hose assembly analysis apparatus for estimating an in-situ lifespan of a hydraulic or pneumatic hose assembly in an installation, the apparatus including:

means for receiving hose assembly data;

means for displaying a plurality of lifespan factors that are to be rated;

means for receiving ratings data for each of the lifespan factors for the installation;

lifespan calculation means for calculating an estimated hose assembly lifespan based on the received hose assembly data and the received ratings data; and means for indicating an estimated lifespan for the hose assembly based on the calculated lifespan.

Thus, the present invention approaches hose assembly safety by estimating an in-situ lifespan for the hose assembly. A user may then be guided by this estimate in their dealings with the hose assembly. For example, a user may replace the hose assembly towards the end of its estimated life, before failure occurs. The present invention may also assist in determining an inspection schedule for on-going inspection of the hose assembly. It may further assist in the initial selection of a hose assembly that is appropriate for a particular situation and for a desired lifespan.

The present apparatus provides a consistent framework for an operator to assess the likely lifespan of a hose assembly in a particular installation, which can assist an operator in providing a reliable, consistent and logical lifespan estimate.

In use, a hose assembly assessor will input data relating to the hose assembly into the apparatus, and the apparatus will prompt for ratings data on a number of lifespan factors that are known to affect hose assembly lifespan. The user can then input ratings information relating to these factors, and the apparatus will determine a lifespan estimate based on these values.

In one embodiment, the lifespan estimate is based on a basic, e.g. maximum, lifespan for the hose assembly, which is then modified based on lifespan factors.

The lifespan factors may take any suitable form. They preferably relate to installation, operational and environmental factors associated with the hose assembly and installation site. The factors may relate not just to the hose itself, but to the whole hose assembly (i.e. to the hose and the hose couplings). This takes into account the influence of the couplings on the overall integrity of the hose assembly, which is often neglected.

The lifespan factors may include: factors relating to the hose of the hose assembly; factors relating to the couplings of the hose assembly; factors relating to the conveyed fluid, e.g. wear due to standard and transient pressure pulses, compatibility and the like; factors relating to the surrounding working environment, e.g. temperature, abrasion and corrosion considerations and the like; and factors relating to the manner in which the hose assembly is installed, e.g. routing features, bending radii, orientations, loads and the like.

The basic lifespan may in one embodiment correspond with a hose lifetime provided by the supplier of the hose. It may for example be a hose shelf life. In one embodiment, the basic hose assembly lifespan may be set at about 10 years, which corresponds with the standard shelf life for a rubber-hose. This value may be applied not only to rubber hoses, but also to e.g. synthetic hoses, for which there may be no maximum shelf life given. A basic lifespan could also be chosen based on an assessor's experience and/or on historical data associated with the particular type of hose assembly under inspection.

In another embodiment, the basic lifespan may be set based on a maximum number of impulse cycles that it is considered that the hose may safely undergo over its lifetime. This impulse lifespan may be the number of impulse cycles that the hose is rated for by the hose supplier. The number could for example be determined through any appropriate industry standard test, such as SAE J343 or ISO 6605.

In one preferred embodiment, the basic impulse lifespan is based on a percentage of the rated impulse cycles. This can provide a safety margin, and may be e.g. 80% of the rated value. This safety value could be varied based on an assessor's experience and/or historical data associated with the particular type of hose assembly under inspection and the particular installation situation and other factors for example relating to the degree of safety required, e.g. a higher pressure application may need a higher safety margin.

Generally, an impulse lifespan in years may be determined by estimating the number of impulses cycles that the hose will be subjected to, and by dividing the rated maximum number of impulse cycles by this estimate.

If the manufacturer's impulse cycle rating is used in this method, however, it may not provide the most appropriate basic lifespan, as the number of expected pulses per annum is for pulses at system pressure, whereas the manufacturer's rated number of cycles for the hose is based on pulses that are a set percentage (% MWP) above the maximum working pressure (MWP). For example, the rated number of pulses may be based on a pressure that is 120%, 125% or 133% of MWP.

Therefore, in one embodiment of determining a basic lifespan, the rated maximum number of impulse cycles (at % MWP) is converted to a maximum number of impulse cycles at system working pressure before it is divided by the estimated annual number of pressure pulses.

In order to achieve this conversion, a straight-line relationship is assumed between the log of the maximum number of impulse cycles and the log of the impulse cycle pressure. Two points on this line can be identified from the manufacturer's information: A maximum of one impulse cycle at minimum burst pressure (MBP), and the rated maximum number of cycles at % MWP. Accordingly, the following relationship can be applied: Rated number of impulse cycles=[MBP/(MWP*% MWP)]$^x$, and the conversion can be achieved by solving this relationship for "x" using the manufacturer's information, and by determining a new maximum number of impulse cycles (at system pressure) as: Max. number of impulse cycles=[MBP/(System pressure*% MWP)]$^x$.

As said, this limit on the number of impulse cycles may be multiplied by the lifespan safety factor, e.g. 80%, and then divided by the yearly estimate of impulse cycles to obtain a basic impulse lifespan.

In another embodiment for determining the basic impulse lifespan, the number of impulse cycles to which the hose is subjected per annum (which is estimated and input by the assessor), is converted by the apparatus into an effective number of impulse cycles per annum at MWP (as opposed to system WP), and the hose's rated maximum number of impulse cycles is multiplied by the impulse test pressure (% MWP). The basic impulse lifespan is then determined by dividing the latter value by the former and by multiplying by any required safety factor, e.g. 80%.

In this method, in order to determine the effective number of impulse cycles per annum at MWP, the estimate for impulse cycles per annum input by the assessor is multiplied by a ratio of system pressure to maximum working pressure (this ratio may be squared or the like).

This further method has been found from experience to provide an effective indication of basic impulse life.

It has been found that the first of these two methods is particularly useful at higher system pressures, but not so useful at lower pressures. The second of the two methods has been found to work well at lower pressures, and, in one embodiment basic impulse lifespans are calculated by both methods and are compared. The basic impulse lifespan may then be taken as the minimum of the two methods.

In one embodiment of the present invention, a first (impulse) lifespan is determined based on the influence of the working fluid impulse cycles, and a second (service) lifespan is determined based on other factors, e.g. relating to the configuration of the hose assembly on installation and to surrounding environmental factors. A final hose assembly lifespan may then be based on an assessment of both of these lifespans. For example, the predicted hose assembly lifespan may be taken as the minimum of the impulse lifespan and the service lifespan.

These impulse and service lifespans may be calculated from basic impulse and service lifespans, e.g. determined as discussed above, that are then modified by various lifespan factors.

The impulse lifespan may be based on lifespan factors associated with the conveying of the fluid. One lifespan factor may be the average number of impulse cycles per annum expected for the hose assembly in the situation under assessment. Another factor may be the hose bend radius at the coupling, and also the amount of flexing at the coupling. A further factor may be the likelihood of large transient pulses. Ratings of these factors may take account of the degree of bending of the hose at the couplings, in static and/or operational states, the angular degree/amplitude and frequency of flexing of the hose at the couplings, and the size, variation and frequency of transient pulses.

The service lifespan may be based on lifespan factors associated with wear on the hose assembly caused by factors other than impulse considerations, including environmental conditions and installation placement and routing. One factor may be the actual working temperature (e.g. maximum, minimum and/or average) at the site, which may be compared with a rated working temperature (e.g. maximum, minimum or average) to provide a rating. Another factor may be the actual working pressure (e.g. maximum), which again may be compared to the rated working pressure (e.g. maximum). Another factor is the likelihood of abrasion of the hose, as is the provision of cover protection. A further factor is hose bend radius, that is bending at sites along the length of the hose rather than at the hose couplings. Another factor is the hose assembly routing, e.g. orientation, twisting, extension, securing points, and securing methods. Also, a factor may be related to whether the hose assembly is subject to any mechanical loads, e.g. how often and to what amount. Further general environmental factors may also be taken into account, e.g. exposure to ultraviolet light, ozone, salt water, chemicals, corrosive materials, air pollutants or vibrations. These may for example be classed together under a single environmental factor. Coupling corrosion and hose compatibility with the working fluid and/or environmental fluids may also be factors.

Other lifespan factors may also be taken into account, such as periodic mechanical abuse, general cleanliness, condition of or degradation of the working fluid and other local conditions.

The lifespan factors will generally have a negative effect on lifespan life, but may also have positive effects, e.g. a protective cover would have a positive effect against abrasion.

The ratings may be given in any desired manner, although it is preferred that an assessor selects a value from a range of discrete ratings values. Thus, the assessor may provide a rating of 0 to 7, or other such ratings scale, for each of the lifespan factors. For example, for a 0 to 7 rating, the ratings may correspond to nil, light, moderate, constant, severe, acute, extreme and destructive.

The ratings may be made based on the assessor's experience and understanding of the various possible hose assembly installation scenarios.

The apparatus may also aid in the ratings assessment by including a database of guidelines for each factor that indicate what aspects of the installation must be taken into account in each case and what degree of bend or the like is likely to relate to what rating. A database of typical ratings for various different installations may also be provided, and the apparatus may suggest a rating based on input data to do with the type of installation under assessment and the type of hose assembly.

The apparatus itself may determine ratings based on input hose and installation data. For example, instead of inputting a temperature or pressure rating, a user may input a working temperature and pressure for the installation, and the apparatus may determine a rating based on this information. It may for example compare the data with rated hose temperatures and pressures that e.g. may be input by the user and/or obtained from a database based on a hose identification (e.g. a tradename or a hose type) input by the user.

The apparatus may also modify user ratings. For example, a user may input an abrasion rating based on the abrasion characteristics of the installation site, and the apparatus may modify this rating based on the abrasion characteristics of the hose (e.g. it may reduce the abrasion rating based on the degree of protection that the hose cover and any hose shielding may provide). The hose abrasion characteristics/ratings may be determined by the apparatus from a look-up of the hose type in a database of hose characteristics.

Preferably, the majority of the lifespan factors are rated in the same manner, e.g. from 0 to 7. The rating may then be applied to the lifespan calculation with a suitable weighting. This then allows the assessor to use a consistent ratings level, without having to consider the relative importance of the factors with respect to one another and/or with respect to hose types, which can be accounted for in the weightings.

In one embodiment, the ratings are converted to percentages of lifespan, and the product of 1 minus these values determines the percentage by which the basic lifespan is to be reduced. The ratings may for example be converted to values between 0 and 1, and the basic lifespan can be multiplied by the product of the 1 minus the ratings values. Although not necessary, it is preferred for the highest ratings value, e.g. 7, corresponds to a 100% reduction in lifespan, to accommodate destructive situations. It is also preferred for the lowest ratings value, e.g. 0, to correspond to a 0% reduction in lifespan.

One weighting method uses a function based on a ratio of the given rating to the maximum rating. This may provide a value between 0 and 1 that may be used as a percentage reduction in lifespan. The ratio may be raised to a power, e.g. 2, which may be varied to vary the weighting of the rating over the range of ratings possible. Thus, a weighting may be: affect=(given rating/max. rating)$^n$.

The hose data input may include the type of hose and/or specific make of hose, and these may be used e.g. to determine further hose data from a database of hose characteristics. The user may also input other data e.g. the maximum hose service life, e.g. shelf life, the maximum number of impulse cycles that can be withstood in a lifetime, rated working temperatures and pressures, e.g. maximum and minimum temperatures, a rated minimum burst pressure and a rated maximum working pressure, and hose cover material and protection and the like. These can then be used to e.g. establish basic lifespans, and also to assess the lifespan factor ratings, e.g. in relation to actual working pressure and working temperature lifespan factors.

The apparatus may also allow the user to vary various parameters, such as the basic service life or the basic impulse life. For example, the basic impulse life may be varied by varying the impulse life safety factor that corresponds to the percentage of the impulse cycles rating value that is used.

The apparatus may allow a user to modify the degree to which any particular lifespan factor affects the lifespan. Thus, the relative affect of a factor in relation to another factor may be varied by a suitable weighting of the factor in the lifespan calculation.

The lifespan calculation may be used in association with a new inspection system. Thus, a hose assembly assessor may inspect a plant and determine a hose assembly lifespan as discussed above. The assessor may then implement an inspection schedule (which may e.g. be more regular towards the end of the expected life of the hose assembly). On each visit the assessor may visually grade the hose assembly according to a discrete grading scale, e.g. 1 to 3, depending on the visual state of the hose assembly. In one preferred embodiment, a grade 1 indicates that the hose assembly is fit for purpose and need not be replaced, a grade 2 indicates that the hose assembly should be replaced as soon as practicable, e.g. it may not continue to be fit for purpose, and a grade 3 indicates that the hose assembly is not fit for purpose and should be replaced immediately. The assessor may also determine that the hose assembly needs to be replaced when it has reached the end of its estimated lifespan. For example, the attaining of the estimated lifespan may incur an automatic grade 2 assessment. This estimated lifespan may however be adjusted, e.g. if the hose assembly is clearly in good condition. Thus, the invention allows for an iteration on the lifespan based on inspection of the hose assembly over time.

The inspection results may be used as feedback to the lifespan determining apparatus. For example, if a hose assembly lasts for a shorter or longer period than expected, the lifespan factors and basic lifespans may be altered in the lifespan determining apparatus to reflect this, e.g. in a database entry for the hose assembly type.

The grading preferably not only assesses the hose of the hose assembly, but also the hose couplings. Thus, a grade may be assigned to the hose itself, and to each of the couplings, and the highest/worst grade may be selected as the overall hose assembly grade.

The grading process both quantises the assessment of a hose assembly and also takes account of the integrity of the whole hose assembly.

The present invention may be implemented in a variety of ways, and may take the form of a computing device running appropriate software. For example, the apparatus may take the form of a portable computing device, e.g. a laptop or tablet pc, that an assessor may take out to a plant under assessment. It could also be implemented over a communications network, e.g. through a website or a mobile telephone connection, with data being input remotely to a central server that may e.g. provide data and/or conduct calculations and provide results.

The present invention extends to computer software for estimating an in-situ lifespan for a hydraulic or pneumatic hose assembly in an installation, the software including:

an input component for receiving hose assembly data;

a lifespan factors component for displaying a number of lifespan factors that are to be rated;

a ratings component for receiving ratings data for each of the lifespan factors for the installation;

a lifespan calculation component for calculating an estimated hose assembly lifespan based on the received hose assembly data and the received ratings data; and a component for indicating an estimated lifespan for the hose assembly based on the calculated lifespan.

The present invention also extends to computer software products including a data storage medium on which software according to the present invention is stored.

The present invention further extends to a method of estimating an in-situ lifespan of a hydraulic or pneumatic hose assembly in an installation, the method including the steps of:

determining a set of hose assembly data;

determining a set of lifespan factors that are to be rated;

ratings each of the lifespan factors for the installation and the hose assembly;

calculating an estimated hose assembly lifespan based on the hose assembly data and the ratings for the lifespan factors; and indicating an estimated lifespan for the hose assembly based on the calculated lifespan.

The present invention may also be seen as providing a hydraulic or pneumatic hose assembly analysis apparatus for determining an estimated in-situ lifespan of a hose assembly in a particular environment, the apparatus including:

input means for receiving hose assembly data;

means for determining a basic lifespan for a hose assembly based on the hose assembly data;

means for displaying a number of installation, operational and/or environmental lifespan factors that are to be rated;

input means for receiving ratings data for each of the lifespan factors;

means for modifying the basic lifespan based on the inputted ratings for the lifespan factors; and means for indicating an estimated lifespan for the hose assembly based on the modified basic lifespan.

Viewed from another aspect, the present invention may also be seen as a new system for inspecting hose assemblies in-situ, and provides a hydraulic or pneumatic hose assembly grading system, in which a hose assembly is inspected to determine both the visual state of the hose of the hose assembly and the visual state of each of the hose couplings of the hose assembly, wherein the hose and each of the couplings are each assigned a fitness grade in a discrete fitness grading system, wherein the grading system includes a first grade indicating, that a component need not be replaced, a second grade indicating that a component should be replaced at the next available opportunity, and a third grade indicating that a component should be replaced immediately, and wherein the hose assembly is assigned the third grade if any of the hose or couplings is assigned the third grade, is assigned the second grade if any of the hose or couplings receives the second grade and none receives the third grade, and otherwise receives the first grade.

Viewed from another aspect, the present invention provides a hose assembly grading apparatus for determining the fitness for purpose of a hose assembly in-situ, the apparatus including:

means for indicating a number of discrete grades of fitness for purpose into which the hose assembly may be graded;

means for receiving a grade for a hose of the hose assembly;

means for receiving a grade for each of the hose couplings of the hose assembly;

means for determining the worst fitness for purpose grade of the received grades;

means for grading the hose assembly with the worst determined fitness for purpose grade;

means for displaying the grade of the hose assembly.

It should be noted that any of the aspects mentioned above may include any of the features mentioned above in relation to the first aspect of the present invention.

Embodiments of the present invention will now be described, by way of example only, with reference to the accompanying drawings. It is to be understood that the particularity of the drawings does not supersede the generality of the preceding description of the invention.

In the drawings:

FIG. 8 is a table of procedures used in the grading process associated with FIG. 7.

Figure 1:
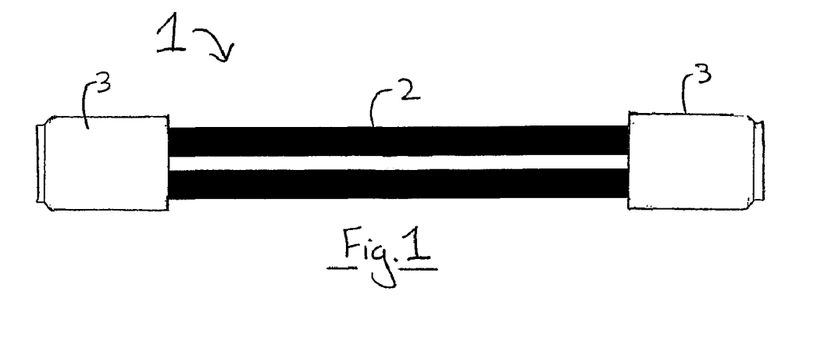
FIG. 1 shows a typical hose assembly that may be used in hydraulic or pneumatic control or power systems.

Referring to FIG. 1, a hydraulic or pneumatic hose assembly 1 will generally include a length of hose 2 and a pair of couplings or fittings 3, one at each end of the hose 2.

The hose 2 may be of any suitable length and diameter, depending on the application, and may be made from any suitable material. It may for example be made of natural or synthetic rubber or of plastics or metal, and may be reinforced or non-reinforced. It may for example be formed from an elastomer, and may be of a rubber or plastics composition. It may for example be made of e.g. neoprene (polychloroprene), nitrile (acrylonitrile and butadiene), Hypalon™ (chlorosulfonated polyethylene), EPDM (ethylene propylene diene), CPE (chlorinated polyethylene), nylon (polyamide resin) or Teflon™ (fluorinated thermoplastic). It may have a protective sleeve or other armour, e.g. to protect it from abrasion and the like, and may include a shielding layer to militate against high-pressure fluid sprays, should failure occur. It may be wire-reinforced or textile reinforced.

The couplings 3 may take any suitable form, depending on the application, and may engage with the hose ends by clamping or crimping or in any other suitable manner. They may have any suitable shape, and for example may be straight as shown, or elbowed. They may for example be made of metal, e.g. steel, brass, stainless steel or the like.

Hydraulic and pneumatic hose assemblies may be used in many different applications. They may be used with many different machines, ranging from heavy machinery to portable and hand-held power tools, and may be used in many different situations, e.g. in a factory, on a construction site or down a mine.

Figure 2:
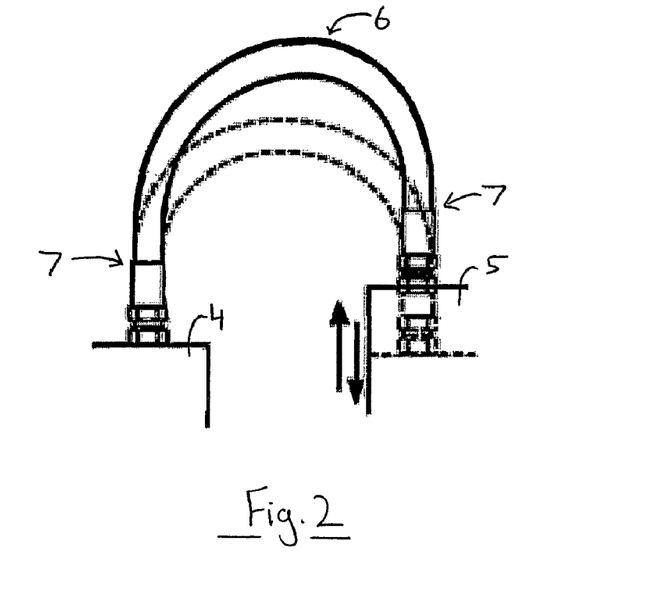
FIG. 2 is a schematic diagram showing one possible installation arrangement for a hose assembly.

An example of one possible mounting of a hose assembly 1 is shown schematically in FIG. 2. The hose assembly 1 is connected between a stationary machine part 4 and a moving machine part machine 5, and may take up positions between the two limit positions shown in solid and phantom lines.

As can be seen, in a typical scenario such as this, the hose 2 will be bent along its length, e.g. at site 6, and will also be bent adjacent the couplings 3, e.g. at sites 7. Further, the hose 2 will flex at the coupling sites 7, over a range of bending angles, in accordance with the movement of the machine part 5.

Over time, the hose assembly 1 will wear-out, and, if not replaced, will eventually fall.

Failure of the hose assembly 1 is of considerable concern, from both a safety and a productivity point of view. Thus, a failed hose assembly could cause injury through whipping of the hose, through spraying or injection of the conveyed high-pressure fluid onto or into a person, or through malfunction of the machine that is being controlled or powered. The machine would also need to be shutdown for repair, which could cause significant downtime costs, especially if there is a knock-on effect to other areas of a manufacturing process or the like.

At present, hoses are tested in a laboratory and are given various ratings that relate to e.g. a maximum burst pressure and the maximum number of impulse cycles that can be applied to the hose in its lifetime. A hose is then chosen for an application based on these considerations.

In accordance with the embodiments of the present invention discussed herein, however, an estimate is made of the in-situ lifespan of a hose assembly based on a consideration of the hose assembly's installation and working environment.

This lifespan estimate can assist in determining when to replace a hose assembly, before it falls. It can also assist in providing an on-site hose assembly inspection program, and can help in the initial decision on what type of hose assembly to install for a particular use and desired lifespan.

Thus, the present system aims to replace hosing in a pro-active manner, before it fails, rather than merely reacting to a situation after a hose assembly has failed.

Further, the present analysis system can take account of properties of the hose itself and of the hose couplings, and can take account of the way in which the hose assembly is installed and the conditions under which it operates. This contrasts with the prior art in which no attempt is made to assess lifespan of a hose assembly in a particular situation, and in which the properties of the hose are focussed on without dealing with the hose assembly as a whole and both the hose and couplings together.

The present embodiment provides a tool that can for example be used by a person on a site inspection to rate a number of factors that could affect a hose assembly's lifespan and to thereby determine an estimated hose assembly lifespan.

The apparatus establishes a basic lifespan and then modifies this basic value based on various lifespan factors that can affect the integrity of the hose assembly and that are rated by an assessor.

It provides the assessor with a consistent framework within which to make consistent and reliable lifespan estimates, and allows for a clear and advantageous methodology to be followed.

Figure 3:
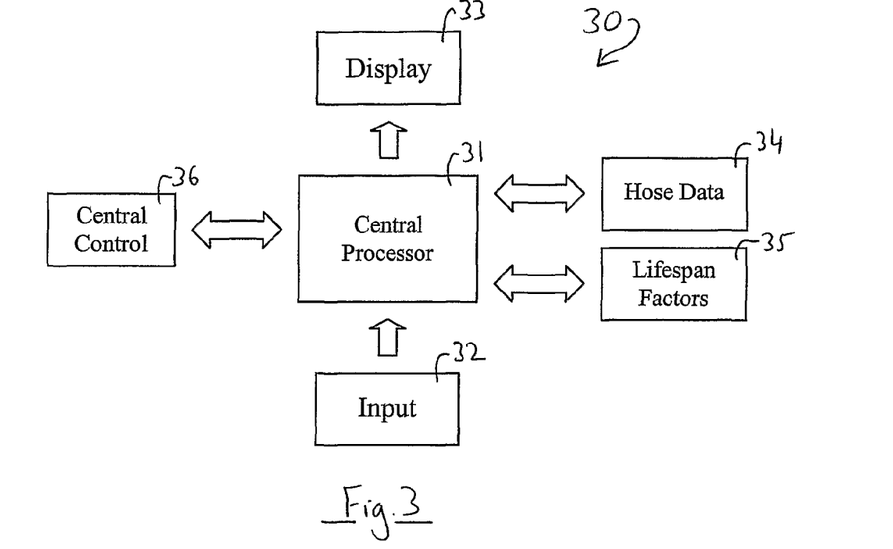
FIG. 3 is a schematic block diagram of a hose assembly analysis apparatus according to one embodiment of the present invention.

FIG. 3 is a schematic block diagram of one embodiment of a hose assembly analysis apparatus 30. A central processor 31 runs an analysis process, such as shown in FIG. 4, during which various prompts are displayed and various data is input, including various hose assembly data and various lifespan factors, and through which an estimated hose assembly lifespan is calculated.

The apparatus 30 includes an input 32, e.g. a keyboard, through which it receives various data from an assessor at an installation site, such as hose assembly data and lifespan factor ratings. It also includes a display 33 for prompting the assessor for information and for displaying the results of lifespan calculations. It may include a memory 34 for storing hose assembly data for various specific hoses or types of hoses and couplings, and a memory 35 for storing various lifespan factors and possibly also information regarding such factors, e.g. how to rate them. The apparatus may communicate with a central control 36, if required, e.g. in order to obtain access to a larger database of hose or lifespan factor information. It may include other features also, e.g. further input means, such as a scanner or the like for reading a hose assembly label, e.g. a bar code, chip or the like to obtain hose data.

The apparatus may for example be implemented as software on a computing device, e.g. a portable computing device, such as a tablet pc or a laptop computer, which an assessor may take with them to use on-site. It may also be internet/web-based or the like.

Figure 4:
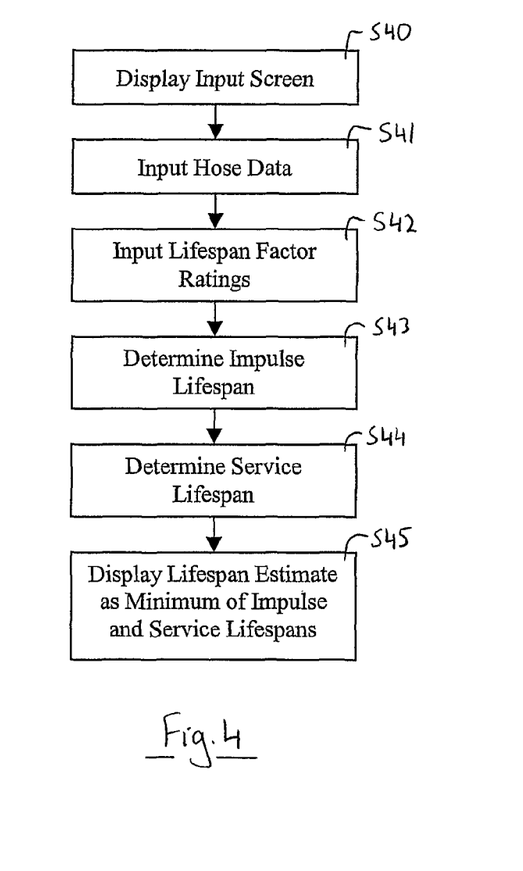
FIG. 4 is a flowchart showing steps involved in determining a hose assembly lifespan, as may be carried out by the apparatus of FIG. 3.

Referring to FIG. 4, in step S40, the apparatus 30 will display an input screen to prompt the user to enter necessary information. The input screen may for example take a form similar to that shown in FIG. 5, although initially without various data fields filled-in.

In step S41, the assessor inputs hose data, which may include the hose type and various hose ratings data, such as working temperatures and pressures. It may also include the maximum number of impulse cycles that the hose 2 is rated to withstand over its lifetime. This impulse maximum is generally determined in a laboratory test for a number of continuously repeated fluid pulses of standard amplitude and duration. A suitable test may be found in e.g. SAE standard J343, although any other test for providing a meaningful lifetime impulse limit could also be used.

Other information may also be input, such as the type of working fluid and external fluid to which the hose assembly will be subjected, and the type of hose cover and protection used.

The input hose values could also be conveniently provided in a database (that is provided in the apparatus or that the apparatus may connect to remotely), so that the assessor need only input the hose identification, and the apparatus can provide the associated hose rating information automatically.

Next, in step S42, the assessor inputs ratings for a number of lifespan factors. These factors will be factors that influence the lifespan of the hose assembly 1 when installed, and may include the factors listed in the table of FIG. 6.

Figure 6:
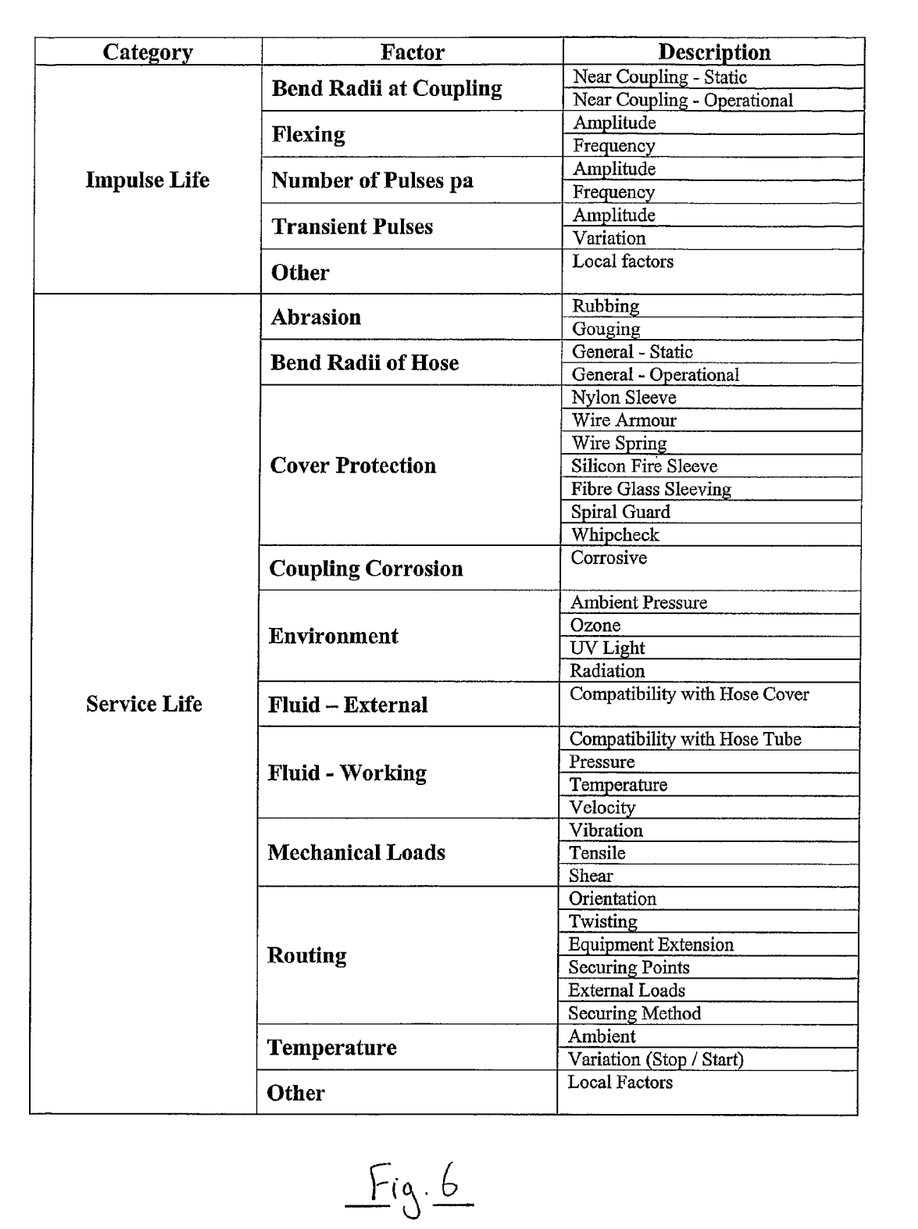
FIG. 6 is a table of lifespan factors and associated considerations.

They may include: factors relating to the hose; factors relating to the couplings; factors relating to the conveyed fluid, e.g. wear due to standard and transient pressure pulses, compatibility and the like; factors relating to the surrounding working environment, e.g. temperature, abrasion and corrosion considerations and the like; and factors relating to the manner in which the hose assembly is installed, e.g. routing features, bending radii, orientations, loads and the like.

After an assessment of the hose assembly and site, the assessor rates each of the lifespan factors that are displayed by the apparatus 30 on a discrete scale, e.g. of 0 to 7. The ratings represent the degree to which a particular lifespan factor is present, e.g. according to a classification of nil, light, moderate, constant, severe, acute, extreme and destructive.

The user may also input actual values for factors, e.g. temperatures, pressures and the like, which the apparatus may then covert into ratings, e.g. between 0 and 7, through a comparison with rated data for the hose assembly.

Once the data is input, the apparatus 30 determines an impulse lifespan in step S43 and a service lifespan in step S44.

In step S43, a basic impulse lifetime is established based upon the rated number of impulse cycles for the hose, for example a maximum of 500,000 or 1,000,000 cycles. This value may be divided by the estimated number of impulse cycles applied to the hose assembly per year in order to obtain the basic impulse lifespan in years.

The rated value may be modified by an impulse life safety factor, which may be for example 80%, to give a maximum basic impulse lifetime of e.g. 400,000 or 800,000 impulse cycles. The impulse life safety factor is used to reduce the hose assembly lifetime so as to provide an additional level of safety, and may be modified based on experience. It could for example be lowered below 80% or increased, possibly to 100%, depending on the situation.

Other ways of determining a basic impulse lifespan are discussed below.

The basic impulse lifespan is then modified by the lifespan factors that the apparatus associates with the impulse lifespan so as to determine a modified maximum impulse lifetime.

Thus, division of the rated maximum number of pulses for the hose by the expected average number of pulses per year will give a base lifetime in years for the impulse lifespan, and this value is modified based upon the ratings of the various impulse lifespan factors that are input by the assessor.

In a similar manner, in step S44, the service lifespan is based on a basic maximum service lifespan that is modified by the ratings of those lifespan factors that the apparatus 30 associates with the service lifespan. The basic service lifespan may be taken from e.g. a manufacturer's suggested lifespan, or may be decided on by testing or experience. It may be set at e.g. 10 years, which is the standard shelf life of a rubber hose. This value may be used for both rubber and synthetic hoses.

Once the impulse and service lifespans are established, the apparatus 30 determines a final hose assembly lifespan based on a consideration of the two values, and displays it as step S45. In the present embodiment, for example, the final hose assembly lifespan is taken to be the minimum of the impulse lifespan and service lifespan.

The estimated hose assembly lifespan is useful in a number of ways. For example, it may be used to design an inspection regime and audit for the hose assembly, and to ensure that the hose assembly is replaced before failure.

It may also be used in a reverse manner to assist in the initial decision on which type of hose assembly to install, e.g. based on an input minimum lifespan before replacement is necessary. Thus, the apparatus 30 may include a database of hose assembly data for a number of hose assemblies, and may determine which of these would fulfil a desired minimum lifespan input based on the input lifespan factor ratings.

Figure 5:
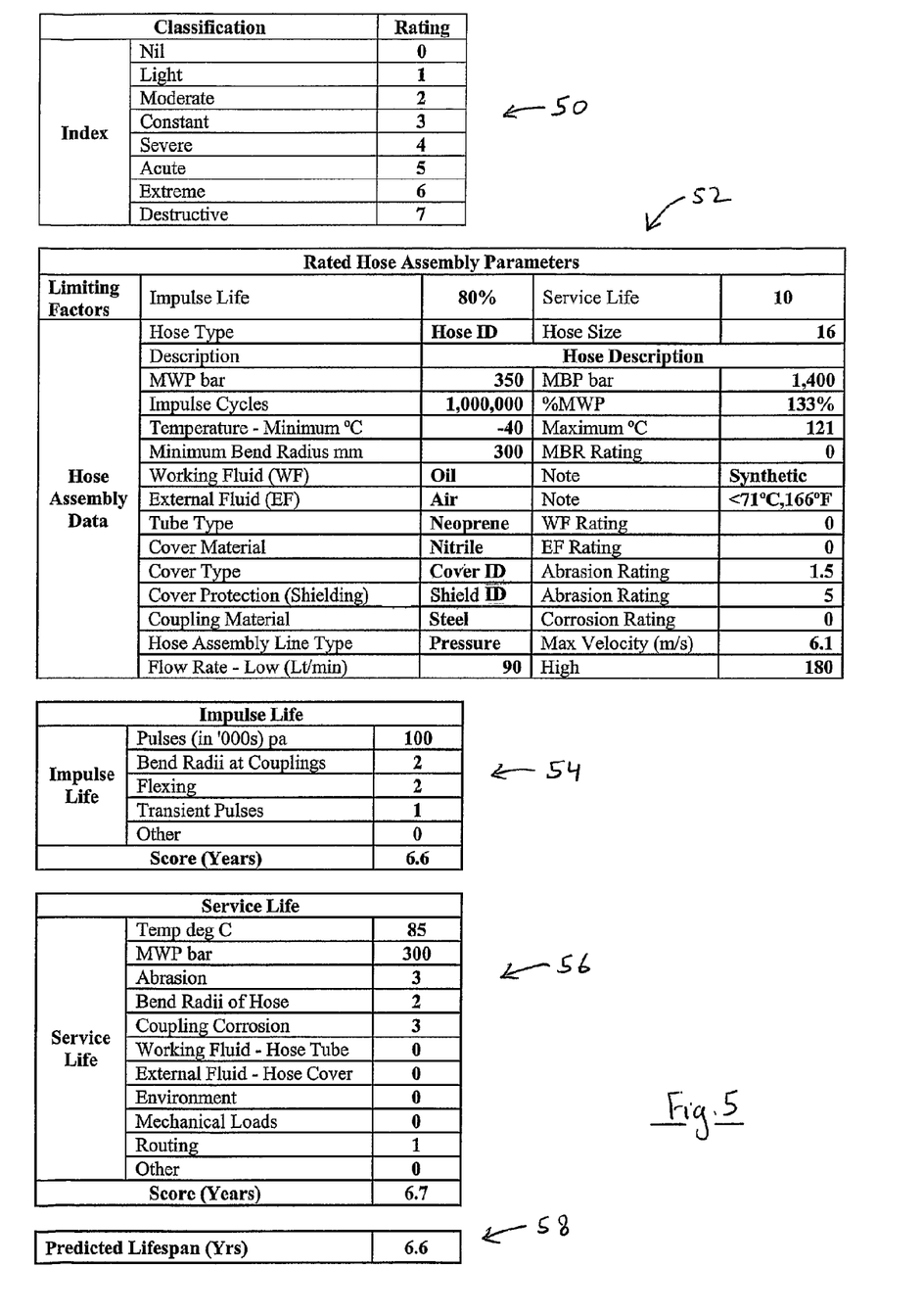
FIG. 5 shows display prompts and information provided by the apparatus of FIG. 3.

Referring to FIG. 5, this shows a possible screen display provided by apparatus according to an embodiment of the present invention.

As can be seen, display block 50 confirms to the assessor the ratings values (0-7) that may be assigned to the lifespan factors, and indicates their general meanings.

In display block 52, the basic impulse and service lifetimes are limited by an impulse life safety factor and a set number of years, here shown as 80% and 10 years respectively. These can be varied if experience suggests different values are more optimal.

Also in block 52 is the hose assembly data input by the assessor and/or determined by the apparatus based upon the hose type identified by the assessor.

The data may includes a hose identification number, e.g. a proprietary hose ID or an industry standard hose ID, a hose size, a description of the hose, e.g. trade name, a rated maximum working pressure (MWP) in bar, a rated minimum burst pressure (MBP) in bar, a rated total lifetime number of impulse cycles, the percentage (% MWP) of rated MWP at which the rated lifetime number of impulse cycles is assessed, rated minimum and maximum hose temperatures in degrees Celsius or Fahrenheit or other scale, a rated hose minimum bend radius and rating, working fluid and external fluid types and notes thereon, tube and cover materials and fluid ratings therefor, hose cover type identification and cover protection identification and abrasion ratings therefor, coupling material and corrosion ratings, and hose assembly line type and maximum working fluid velocity and flow rates (low and high).

These values can be obtained from the manufacturer of the hose or from industry standards or by experiment, and will generally be provided on a label attached to the hose. The information may also be found in a database in the apparatus 30 from the hose identification. The MBR, WF, EF, abrasion and corrosion ratings may be determined from preset values for the various types of hose materials and fluids.

Display block 54 displays the lifespan factors associated with the impulse lifespan. In this example, in the ratings column, the assessor has input an estimated number of impulse cycles per annum as 100,000. A "2" rating is shown for "bend radii", which implies that the hose's normal orientation at the couplings (e.g. at sites 7 in FIG. 2) is moderately bent. A "flexing" rating of "2" implies some moderate of flexing of the hose at the couplings, and a "transient pulse" rating of "1" indicates that the transient pulses are light, e.g. either infrequent and/or only of small amplitude. A general "other" factor has been given a "0".

The "other" factor may cover e.g. aspects that are applicable only to a specific application, or may allow an assessor to reduce lifetime based on a number of minor factors which in themselves are not of great importance, but which taken together should be given some input into the calculation. Again, the "other" factor may be rated between "0" and "7".

The effect of each factor can be suitably weighted so that the various factors have different relative effects on the lifespan for the same rating. Thus, one factor may be more important than another, and may make a larger lifespan change for the same rating. The weightings allow a user to use a consistent rating system for all of the lifespan factors, without having to consider their relative importance.

To calculate an impulse lifespan, a basic lifespan is first calculated based on the rated maximum number of impulse cycles for the hose and the estimated average number of impulses per year input by the assessor. The ratings of the next four factors are then used to determine a negative lifespan effect based on their rating. Each rating may be converted into a percentage decrease in lifespan, in accordance with a suitable weighting, and these percentages may be subtracted from 100%. The basic lifespan is then multiplied by the resulting percentage to give the final impulse lifespan.

The final impulse lifespan is shown for this example as 6.6 years.

The conversion of the rankings to lifespan percentages may be such that a rating of zero corresponds to a zero reduction in lifespan and a maximum rating, e.g. "7", results in a 100% reduction in lifespan to indicate a destructive situation. For example, the affect of a rating may be determined as a function of a ratio between the rating and the maximum rating. The function may raise the ratio to a power, e.g. 2. Thus, a rating of 2 would equate with an effect on the lifespan of $(2/7)^2=0.082$, e.g. 8.2%.

In one embodiment, the basic impulse lifespan may be calculated by dividing the rated maximum number of impulse cycles by the user-input estimated number of impulses per year and by then multiplying by the impulse life factor of 80%, e.g. $(1,000,000/100,000)*0.8=8$ years.

In another embodiment, however, account is taken of the fact that the estimated pulses per annum are for pulses at system pressure, whilst the hose's rated value is for pulses having a pressure that is above maximum working pressure, e.g. 120%, 125% or 133% Maximum Working Pressure (% MWP).

Thus, one basic impulse lifespan may be calculated by converting the estimated number of pulses per year at the system pressure to an estimated effective number of pulses at MWP per year. This may be achieved by multiplying the input estimate by the square of the ratio of system pressure to MWP. The rated impulse cycles are also converted to pulses at MWP by multiplying by the % MWP. The estimated value can then be divided into the rated value and multiplied by the safety factor, e.g. 80%, to give a basic impulse life in years, e.g. 9.6 years.

Another basic impulse lifespan may be calculated by using the hose's rated value to provide a rated value at systems pressure. This may be done e.g. by determining the relationship between hose MBP (minimum burst pressure), MWP and % MWP, and the rated number of impulse cycles. MWP may then be replaced in the relationship by system pressure to thereby determine a maximum number of allowable pulses at system pressure. This can then be divided by the assessors input of estimated annual impulse cycles at system pressure to give a basic impulse life in years. This may be multiplied by the safety factor to give a final basic value, e.g. of 8 years.

The relationship between MBP, MWP, % MWP and the rated number of impulse cycles may be of the form: $\{MBP/(MWP*\% MWP)\}^x$. This may be solved for x, and MWP replaced by system pressure to obtain a maximum number of allowable pulses at system pressure.

In one embodiment, lifespans are determined based on both these latter two methods, and the smaller lifespan, e.g. 8 years, is chosen as the basic hose impulse lifespan. Also, both methods may include limitations on the size of the lifespan that may be determined, e.g. a maximum of 15 years.

The smaller of the two lifespans calculated by these two methods is modified by the lifespan factors to give a final impulse lifespan, e.g. 6.6 years.

Display block 56 displays lifespan factors associated with the service lifespan, and can be generally understood in the same manner as block 54. Instead of rating the working temperature and the system working pressure, however, an actual value is input for each of them by the assessor. The apparatus can then compare these values to the hose's rated values to give suitable ratings for the temperature and pressure, e.g. depending on the percentage difference between the rated and actual values.

In one embodiment, the temperature rating is calculated as a function of a ratio of actual system working temperature to maximum rated temperature, and these may be less the lowest rated temperature, e.g. (system temp−min. rated temp)/(max. rated temp−min. rated temp). This can avoid variances between ° C. and ° F. or other scales, and allows for different zero points. The rating may for example be 20*(Temp. Ratio)−15, which takes into consideration the rapid deterioration of the hose at elevated temperatures.

In one embodiment, the pressure rating is determined as a function of system pressure to MWP, e.g. 10*(Pressure ratio)−8. This takes into account the affect of high pressures on the hose assembly.

In each case, min and max ratings of 0 and 7, may be set, and maximum ratings may be set when the system temperature is below the minimum rated temperature or the system pressure in below a critical amount. The results of the calculations may be rounded up or down as necessary.

The assessor-given abrasion rating of 3 may be modified by subtracting the hose cover abrasion rating of 1.5 and the cover protection rating of 5 from block 52. This would result in a value of −3.5, except that a lower limit is set for the rating of zero.

The hose bend radii rating of 2 may be modified by subtracting the hose MBR rating from block 52, in this case zero, to give a final bend radii rating. The MBR rating in block 52 accounts for the various degrees to which different hose types are able to accommodate the bending, e.g. based on the flexibility of the hose.

The coupling corrosion value of 3 is modified by subtracting the corrosion rating of the coupling material from block 52, in this case zero, to give a final rating. Again, the coupling rating in block 52 accounts for the ability of different coupling materials to resist corrosion.

The working fluid-hose tube rating and the external fluid-hose cover ratings are not input by the assessor, but are taken from the WF and EF ratings in block 52, which are determined by the apparatus through a look-up of the compatibility between the hose materials and the working and external fluids (including the "notes" describing various of their characteristics, e.g. temperature and the like). They are zero in the present case.

Again, percentage decreases in basic lifespan are determined based on the ratings values, e.g. using suitable weightings, e.g. (rating/7)$^2$. An overall maximum service life is then determined by multiplying the basic service life, in this case 10 years, by the resulting lifespan percentage.

In the case shown, the overall maximum service life is given as 6.7 years.

Finally, the shortest of the calculated impulse lifespan and the service lifespan is given in block 58 as the predicted hose assembly lifespan—6.6 years.

The table of FIG. 6 lists examples of various lifespan factors associated with the impulse life and service life, and provides a description of them.

As said, an impulse life lifespan factor may be hose bend radii at the couplings (e.g. at sites 7 in FIG. 2), and may be assessed based on a static situation (when e.g. the system is idle or non-operative) and on an operational situation (when the system is operational, the hose assembly may move causing the bend radii to change).

Another factor may be hose flexing at the coupling (e.g. at sites 7 in FIG. 2), and may be assessed on amplitude and frequency. A further factor may be transient pulses, assessed for example based on their probable frequency and amplitude, e.g. their variation from the normal.

The term "Other" is for various miscellaneous factors that may be grouped together. They may for example depend on the particular situation at hand, and may include factors that it would not be possible to accommodate specifically in the overall algorithm in view of their local and specific application.

The number of pulses per annum is also a factor and may be assessed on amplitude and frequency.

Service lifespan factors include: abrasion, assessed on how much rubbing and gouging occurs; bend radius of the hose (away from the bend couplings, e.g. at 6 in FIG. 2), which may be assessed on both static and operational conditions and, if multiple bends, may relate to the worst case bend, e.g. the smallest bend radius, and/or to the number of bends; cover protection, assessed on the type of protection and suitability for the installation; coupling corrosion, based on the degree and nature of the corrosion that the couplings may be exposed to; environment, assessed based on e.g. the harshness of the environment, e.g. in terms of ambient light ozone, UV light, radiation, and possibly other factors such as salt water, chemicals and air pollutants; fluid-external, based on the compatibility of the hose cover with the external fluid, e.g. hot air, cool air, water or the like; fluid-working, based on the compatibility of the hose tube with the working fluid, and the temperature, pressure and velocity of the working fluid; mechanical loading, assessed on type, e.g. tensile or shear loads and associated vibrations; routing, based on the installation configuration, e.g. orientation, twisting, equipment extensions, goodness of securing points and securing methods, and external loads (e.g. if hanging, gravity could be pulling on the hose, e.g. longitudinally or transversely); and working temperature, assessed on ambient temperature and variations thereof.

As with impulse life, the service lifespan factors may also include an "Other" category, which may relate to specific local factors.

The predicted lifespan can be used in an audit process for a hose assembly. Thus, an inspection schedule may be set up to inspect the hose assembly at set time periods. The estimated lifespan can be used as a tool to assist in management decisions, e.g. as to the frequency of visual inspections. For example, the frequency may be varied towards the expiration of the theoretical lifespan.

Figure 7:
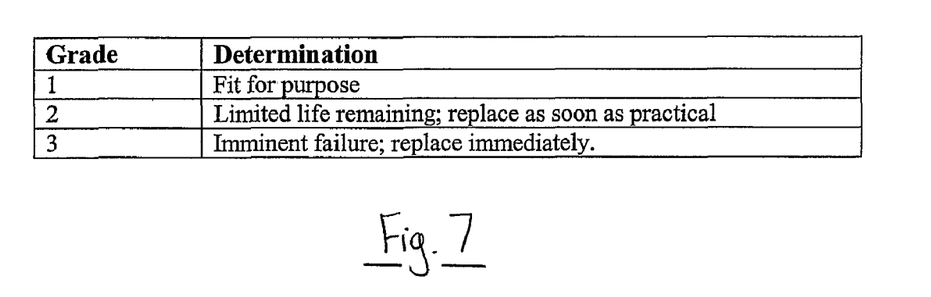
FIG. 7 is a table used in grading hose assemblies during an inspection process.

On each visit, the assessor may visually grade the hose assembly to give one of a discrete number of grades, e.g. 1 to 3, that indicate various stages of fitness for purpose.

A possible grading system is shown in FIG. 7, in which a grade 1 is fit for purpose, a grade 2 is currently fit for purpose but limited life available, replace at the next available opportunity, whilst a grade 3 is replace immediately. Even if the visual inspection does not determine a grade 2 or 3, however, the hose assembly may also be replaced when the predicted lifespan period has expired, and for example the result of reaching the end of the predicted lifespan may be to automatically grade the hose assembly as grade 2.

Criteria for grading are shown in FIG. 8. Firstly, it will be noted that not only the hose is rated, but also the couplings. Each is given a grade based on the criteria exemplified, and then the whole hose assembly is given a grade based on the highest grade for each of the couplings and hose.

The apparatus is configured such that the degree of influence of the lifespan factors and the basic lifespans can be modified based on experience. Thus, an assessor may find that the apparatus is under or over estimating the lifespan for a particular hose assembly or type of hose assembly or across the board. The modification may be to the calculation of a basic lifespan e.g. by varying the impulse life factor and/or the maximum service lifespan, and/or may be through the lifespan factors, e.g. by applying a weighting to each of the factors. These modifications may be applied to the calculations for only one hose assembly, or for a specific type of hose assembly, or may be applied across the board to all calculations.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The invention claimed is:

1. A hose assembly analysis apparatus for estimating an in-situ lifespan of a hydraulic or pneumatic hose assembly in an installation, the hose assembly analysis apparatus comprising:
a display that displays a plurality of lifespan factors that are to be rated for the installation; and
a processor that:
receives hose assembly data,
receives ratings data input by a user for each of the plurality of lifespan factors that are to be rated for the installation, wherein the ratings data that is received includes, for each of the plurality of lifespan factors, a value representative of a user observed condition for that lifespan factor,
calculates an estimated hose assembly lifespan based on the received hose assembly data and the received ratings data,
indicates the estimated hose assembly lifespan, and
determines an impulse lifespan as a step in calculating the estimated hose assembly lifespan, the impulse lifespan being based upon wear caused by pressure pulses in a conveyed hydraulic or pneumatic fluid.

2. The apparatus of claim 1, wherein the processor determines a basic lifespan for the impulse lifespan based upon an impulse cycle rating of a hose of the hose assembly, and modifies the basic lifespan based on the received ratings data of the plurality of lifespan factors.

3. The apparatus of claim 1, wherein the impulse lifespan is determined by impulse lifespan factors that include one or more of: a hose bend radius at hose couplings, hose flexure at hose couplings, and transient pulse characteristics for a conveyed fluid in the installation.

4. The apparatus of claim 1, wherein the processor determines a service lifespan as a step in calculating the estimated hose assembly lifespan, wherein the service lifespan is based upon wear caused by environmental and installation configuration factors, and determines the estimated hose assembly lifespan based upon both the impulse lifespan and the service lifespan.

5. The apparatus of claim 4, wherein the processor determines the hose estimated assembly lifespan based upon a minimum of the impulse lifespan and the service lifespan.

6. A hose assembly analysis apparatus for estimating an in-situ lifespan of a hydraulic or pneumatic hose assembly in an installation, the hose assembly analysis apparatus comprising:
a display that displays a plurality of lifespan factors that are to be rated for the installation; and
a processor that:
receives hose assembly data,
receives ratings data input by a user for each of the plurality of lifespan factors that are to be rated for the installation, wherein the ratings data that is received includes, for each of the plurality of lifespan factors, a value representative of a user observed condition for that lifespan factor,
calculates an estimated hose assembly lifespan based on the received hose assembly data and the received ratings data,
indicates the estimated hose assembly lifespan, and
determines (1) a service lifespan as a step in calculating the estimated hose assembly lifespan, the service lifespan being based upon wear caused by environmental and installation configuration factors, and (2) a basic lifespan for the service lifespan based on a shelf life of a hose, and modifies the basic lifespan based on the received ratings data of the plurality of lifespan factors.

7. The apparatus of claim 6, wherein the service lifespan is determined by service lifespan factors that include one or more of: surrounding working temperature, working pressure characteristics, abrasion characteristics, working environment characteristics, cover protection, bend radius of a hose, mechanical loading characteristics, and routing characteristics.

8. A hose assembly analysis apparatus for estimating an in-situ lifespan of a hydraulic or pneumatic hose assembly in an installation, the hose assembly analysis apparatus comprising:
a display that displays a plurality of lifespan factors that are to be rated for the installation; and
a processor that:
receives hose assembly data,
receives ratings data input by a user for each of the plurality of lifespan factors that are to be rated for the installation, wherein the ratings data that is received includes, for each of the plurality of lifespan factors, a value representative of a user observed condition for that lifespan factor,
calculates an estimated hose assembly lifespan based on the received hose assembly data and the received ratings data, and
indicates the estimated hose assembly lifespan,
wherein the value representative of the user observed condition for that lifespan factor is one of a discrete range of values comprising a value between 0 and 7 according to a classification of nil, light, moderate, constant, severe, acute, extreme and destructive.

* * * * *